United States Patent
Wright et al.

(10) Patent No.: US 7,630,412 B2
(45) Date of Patent: Dec. 8, 2009

(54) METHODS AND SYSTEMS FOR AGGREGATING ETHERNET COMMUNICATIONS

(75) Inventors: Steven A. Wright, Roswell, GA (US);
Thomas Anschutz, Conyers, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 906 days.

(21) Appl. No.: 10/636,366

(22) Filed: Aug. 7, 2003

(65) Prior Publication Data

US 2005/0030974 A1 Feb. 10, 2005

(51) Int. Cl.
*H04J 3/04* (2006.01)

(52) U.S. Cl. ............ 370/536; 370/352; 370/484; 370/494

(58) Field of Classification Search ......... 370/352, 370/484, 485, 487, 494, 495, 535, 536, 537
See application file for complete search history.

(56) References Cited

U.S. PATENT DOCUMENTS

| | | | |
|---|---|---|---|
| H1175 H * | 4/1993 | Giorgio | 370/536 |
| 5,390,239 A * | 2/1995 | Morris et al. | 379/93.08 |
| 5,475,711 A * | 12/1995 | Betts et al. | 375/240 |
| 5,617,417 A * | 4/1997 | Sathe et al. | 370/394 |
| 6,002,670 A * | 12/1999 | Rahman et al. | 370/238 |
| 6,094,683 A | 7/2000 | Drottar et al. | |
| 6,198,749 B1 * | 3/2001 | Hui et al. | 370/463 |
| 6,445,773 B1 * | 9/2002 | Liang et al. | 379/1.04 |
| 6,577,653 B1 * | 6/2003 | Rochberger et al. | 370/536 |
| 6,798,769 B1 * | 9/2004 | Farmwald | 370/352 |
| 6,834,058 B1 * | 12/2004 | Moyal et al. | 370/503 |
| 6,842,768 B1 * | 1/2005 | Shaffer et al. | 709/203 |
| 6,934,326 B2 | 8/2005 | Palm | |
| 7,054,376 B1 * | 5/2006 | Rubinstain et al. | 375/261 |
| 7,154,911 B2 | 12/2006 | Counterman | |
| 7,177,284 B2 * | 2/2007 | Peleg et al. | 370/252 |
| 7,315,538 B2 | 1/2008 | Wright et al. | |
| 2003/0036352 A1 * | 2/2003 | Deguchi | 455/41 |
| 2003/0103559 A1 * | 6/2003 | Palm | 375/222 |
| 2005/0030975 A1 * | 2/2005 | Wright et al. | 370/468 |
| 2006/0098573 A1 * | 5/2006 | Beer et al. | 370/230 |

OTHER PUBLICATIONS

U.S. Appl. No. 10/636,432, filed Aug. 7, 2003 entitled "Methods and Systems for Providing Network Access Service Utilizing Multiple Asymmetric DSL Modems Per Service Point".

U.S. Office Action dated Apr. 23, 2007 cited in U.S. Appl. No. 10/636,432.

United States Patent and Trademark Office, "Office Action," issued in connection with U.S. Appl. No. 10/636,432, mailed Apr. 23, 2007 (8 pages).

* cited by examiner

*Primary Examiner*—Steven H Nguyen
*Assistant Examiner*—Nguyen Ngo
(74) *Attorney, Agent, or Firm*—Hanley, Flight & Zimmerman, LLC

(57) ABSTRACT

Methods and systems provide for the aggregation of Ethernet communications. An Ethernet switch communicates with a network device such as a router or a computer over an Ethernet connection and also communicates with two communications devices such as DSL and/or cable modems over Ethernet connections. Thus, the upload and download speeds available for transporting communications to and from the network device result from the upload and download speeds of the two communications devices in aggregate, as opposed to the upload and download speeds of a single communications device. The two communications devices may communicate with two more communications devices such as those of a service provider network that also have Ethernet connections aggregated at an Ethernet switch to provide access to an Ethernet network for a subscriber. Additionally, the Ethernet switching and communications devices may be incorporated into a single Ethernet aggregation device.

19 Claims, 4 Drawing Sheets

METHODS AND SYSTEMS FOR AGGREGATING ETHERNET COMMUNICATIONS

TECHNICAL FIELD

The present invention is related to Ethernet communications. More particularly, the present invention is related to the aggregation of Ethernet communications.

BACKGROUND

Ethernet communications are a popular data network protocol used to carry frames of data. Ethernet communications are often used within local area networks to carry data between nearby computers as well as within wide area networks where the Ethernet may be carried through lower layer connections such as an asynchronous transfer mode ("ATM") link. Ethernet communications allow for the transfer between end points of higher layer data packets such as Internet Protocol packets that are destined for a remote location such as a domain of the global Internet. Ethernet communications may be of various types, each with its own data rate, and the Ethernet communications may have a same data rate in both the upload and download directions of data transfer for an Ethernet capable device.

The local network or device of a subscriber utilizing Ethernet communications may be provided access to an Ethernet network over a separate communications device that transfers Ethernet frames of data by using the lower layers of the communications protocol, such as ATM transferred over a cable or DSL modem. Thus, the subscriber is provided a cable or DSL connectivity that carries Ethernet frames out of the local network or device. However, the upload and download speeds of the cable or DSL connectivity are typically less than that of the Ethernet communication with these communication devices, and the subscriber is ultimately limited to the bandwidth available through the cable or DSL modem.

Other options for achieving higher bandwidths are available such as Ethernet service directly to the subscriber, but Ethernet service often requires the addition of fiber in the plant between the service provider and the subscriber. Because the copper plant is already in place in most instances, it is more economical to provide data transfer between the subscriber and the service provider network over the existing copper lines. However, the bandwidth limitations for data services using copper lines such as DSL and cable continue to limit the available bandwidth.

While there is discussion and attempts at physical layer bonding, such as the physical layer bonding of DSL modems, this physical layer bonding does not allow for aggregation between a DSL line or similar transport and an existing Ethernet service. Furthermore, intermediate layer aggregation, such as aggregation at the ATM IMA level requires specialized equipment and also suffers from the same limitations as the physical layer bonding attempted for DSL modems.

SUMMARY

Embodiments of the present invention address these issues and others by providing aggregation of Ethernet communications so that multiple communications devices that utilize Ethernet communications may be used to provide data transfer between endpoints, such as between a subscriber and an Ethernet network. Accordingly, one endpoint may have the available bandwidth of multiple communications devices as opposed to the bandwidth of a single communications device.

One embodiment is a method of aggregating Ethernet communications. The method involves providing a first communication device having an Ethernet port and a communication port and providing a second communication device having an Ethernet port and a communication port. The method further involves providing an Ethernet switch in data communication with the Ethernet ports of the first communication device and the second communication device. The Ethernet switch includes an Ethernet port such that data communications of the Ethernet port of the Ethernet switch are provided through the communication port of the first communication device and the communication port of the second communication device.

Another embodiment is a system for aggregating Ethernet communications. The system includes a first communications device having an Ethernet port, a second communications device having an Ethernet port, and a network device having an Ethernet port. An Ethernet switch has a first Ethernet port in communication with the Ethernet port of the first communications device and has a second Ethernet port in communication with the Ethernet port of the second communications device. The Ethernet switch aggregates communications with the first communications device and the second communications device to provide communication through a third Ethernet port in communication with the network device.

Another embodiment is a system for aggregating Ethernet communications. The system includes a first communications device having an Ethernet port and a communications port and a second communications device having an Ethernet port and a communications port. The system further includes a third communications device having an Ethernet port and a communications port, and the communications port of the third communications device is in data communication with the communications port of the first communications device. The system also includes a fourth communications device having an Ethernet port and a communications port, and the communications port of the fourth communications device is in data communication with the communications port of the second communications device. A first Ethernet switch has a first Ethernet port in communication with the Ethernet port of the first communications device and has a second Ethernet port in communication with the Ethernet port of the second communications device. The first Ethernet switch aggregates communications with the first communications device and the second communications device. A second Ethernet switch has a first Ethernet port in communication with the Ethernet port of the third communications device and has a second Ethernet port in communication with the Ethernet port of the fourth communications device. The second Ethernet switch aggregates communications with the third communications device and the fourth communications device.

Another embodiment is an Ethernet aggregation device that includes an Ethernet switching portion linked to an Ethernet port. The device also includes a first communications portion corresponding to a first virtual Ethernet port and is linked to a first communications port such that communications carrying Ethernet frames of the first virtual Ethernet port are transferred through the first communications port. A second communications portion corresponds to a second virtual Ethernet port and is linked to a second communications port such that communications carrying Ethernet frames of the second virtual Ethernet port are transferred through the second communications port. The Ethernet switching portion aggregates Ethernet communications of the Ethernet port between the first and second virtual Ethernet ports.

DETAILED DESCRIPTION

Embodiments of the present invention provide for aggregated Ethernet communications thereby allowing multiple lower-speed communication links between one service end point and another, which increases the available bandwidth at a service endpoint over using a single lower-speed communication link. Therefore, subscribers of DSL or cable data connectivity to an Ethernet network may be provided with a higher bandwidth service than would otherwise be available.

Figure 1:
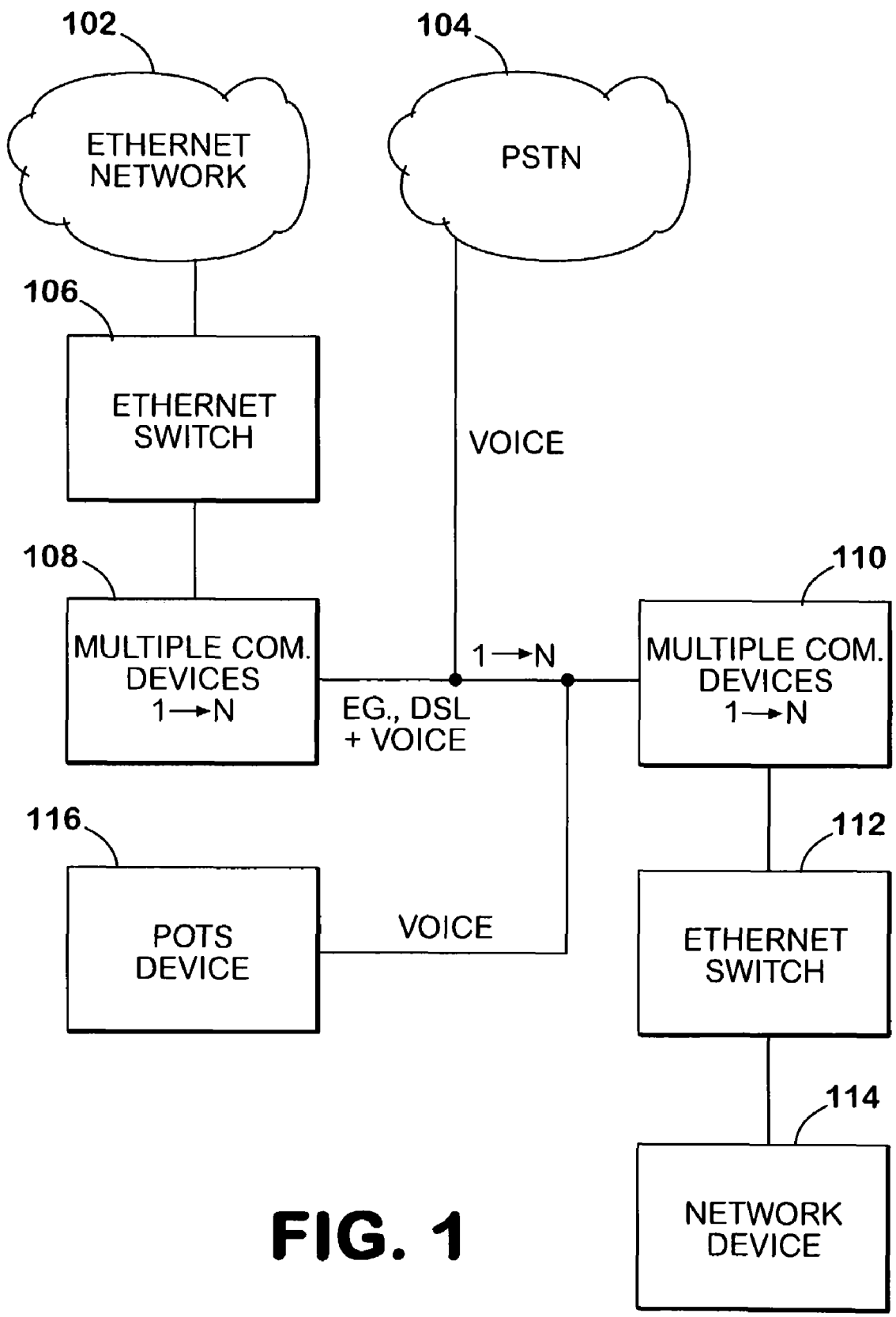
FIG. 1 is a high level view of data service from a service provider network to the subscriber that may utilize embodiments of the present invention to aggregate Ethernet links.

FIG. 1 shows a high level view of an Ethernet service being provided from an Ethernet network 102 to a network device 114 of a subscriber. A service provider maintains the connectivity between the Ethernet network 102 and the network device 114 of the subscriber. The service provider, or another service provider, may also provide access to the public switched telephone network ("PSTN") 104 for subscribers. As shown in FIG. 1, the Ethernet network access is distributed to the subscriber from the Ethernet network 102 in various ways where Ethernet communication is carried between the Ethernet network 102 and the subscriber over one of several available transports.

The Ethernet communications between the Ethernet network 102 and the network device 114 of the subscriber are aggregated at an Ethernet switch 106 of the service provider network 102 so that multiple communications devices may be used to transfer the data between the subscriber and the Ethernet network 102. For example, a set of communications devices 108 such as a set of cable modems or a set of DSL modems contained within a DSL access multiplexer ("DSLAM") are aggregated at the Ethernet switch 106 and are used to transport the higher level Ethernet data communications between a central office ("CO") of the service provider and out to the location of the subscriber. The data communications are received at another set of communications devices 110 such as a set of cable or DSL modems. The data communications are then converted back to Ethernet level communications received by another Ethernet switch 112 that aggregates the multiple communications devices 110. The Ethernet switch 112 provides communication with the network device 114 of the subscriber.

The Ethernet communications may be provided to the subscriber as encapsulated in the lower level of communications such as through a DSL or cable modem service such that the multiple communications devices 110 reside at the subscriber location along with the Ethernet switch 112. As an alternative, the Ethernet communications may be provided directly as a service to the subscriber such as by including the multiple communication devices 110 within the service provider network along with the Ethernet switch 112. In this alternative, the Ethernet connection extends from the Ethernet switch 112 of the service provider network into the location of the subscriber where the network device 114 may connect to the Ethernet service.

The Ethernet communications may be either symmetric or asymmetric, depending upon the configuration of the sets of communications devices 108 and 110. For example, the communications may be made asymmetric by having asymmetric DSL ("ADSL") modems 108 and 110 providing the asymmetry between the upload and download data transfer rates. The upload speed may be faster than the download speed or the download speed may be faster than the upload speed. For example, ADSL modems 108 may be type ATU-C and ADSL modems 110 may be ATU-R so that the download for the subscriber is faster than the upload. Alternatively, the ADSL modems 108 may be type ATU-R while ADSL modems 110 may be ATU-C so that the upload for the subscriber is faster than the download. Furthermore, as discussed with reference to FIG. 3, one ATU-R modem 304 and one ATU-C modem 306 may be aggregated at one end point and one ATU-R modem 310 and one ATU-C modem 308 may be aggregated at the other endpoint to achieve a symmetric data service.

Providing an upload speed faster than a download speed between the ADSL modems 108 and 110 may not be permitted under a regulatory scheme where copper communications extend from the ADSL modem 108 back to the Ethernet network 102 and where the upload speed refers to an upload from the subscriber to the service provider network. However, the ADSL modems 108 may be positioned away from a CO to a point that is closer to the point of service where the ADSL modems 110 are positioned. Communications between the location of the ADSL modems 108 and the network 102 may then occur over fiber to avoid the faster upload speeds from creating copper networking issues.

The aggregated Ethernet communications utilize aggregated Ethernet connections so as to increase the bandwidths of the data transfer directions. The Ethernet switch 106 is positioned between the DSLAM or other service point containing modems 108 and the downstream link back to the Ethernet network 102. The Ethernet switch 106 aggregates the communications of multiple (1-N) modems 108 that are in communication with multiple (1-N) modems 110. The multiple modems 110 are then aggregated by an Ethernet switch 112 located at a service point such as the subscriber point of service.

Thus, the single Ethernet link accessible by the subscriber may benefit from the bandwidth of multiple modem connections to increase the effective bandwidth of the data service being provided to the subscriber. This aggregation of Ethernet links is described below in more detail with reference to FIG. 2.

The aggregated Ethernet communications shown in FIG. 1 may also co-exist with other conventional services such as plain old telephone service ("POTS"). For example, the DSLAM housing DSL modems 108 provides a splitter function to interconnect the link back to the Ethernet network 102 with the DSL modems 108 for data communications while interconnecting voice links between the PSTN 104 and POTS device 116 of the subscriber. The voice links are passed through a filter-splitter on the subscriber end and also at the splitter function of the DSLAM so that the copper line pairs between the DSL modems 108 and DSL modems 110 may carry both the voice signals and the data signals while preventing the data signaling from being heard by the POTS devices 116.

Figure 2:
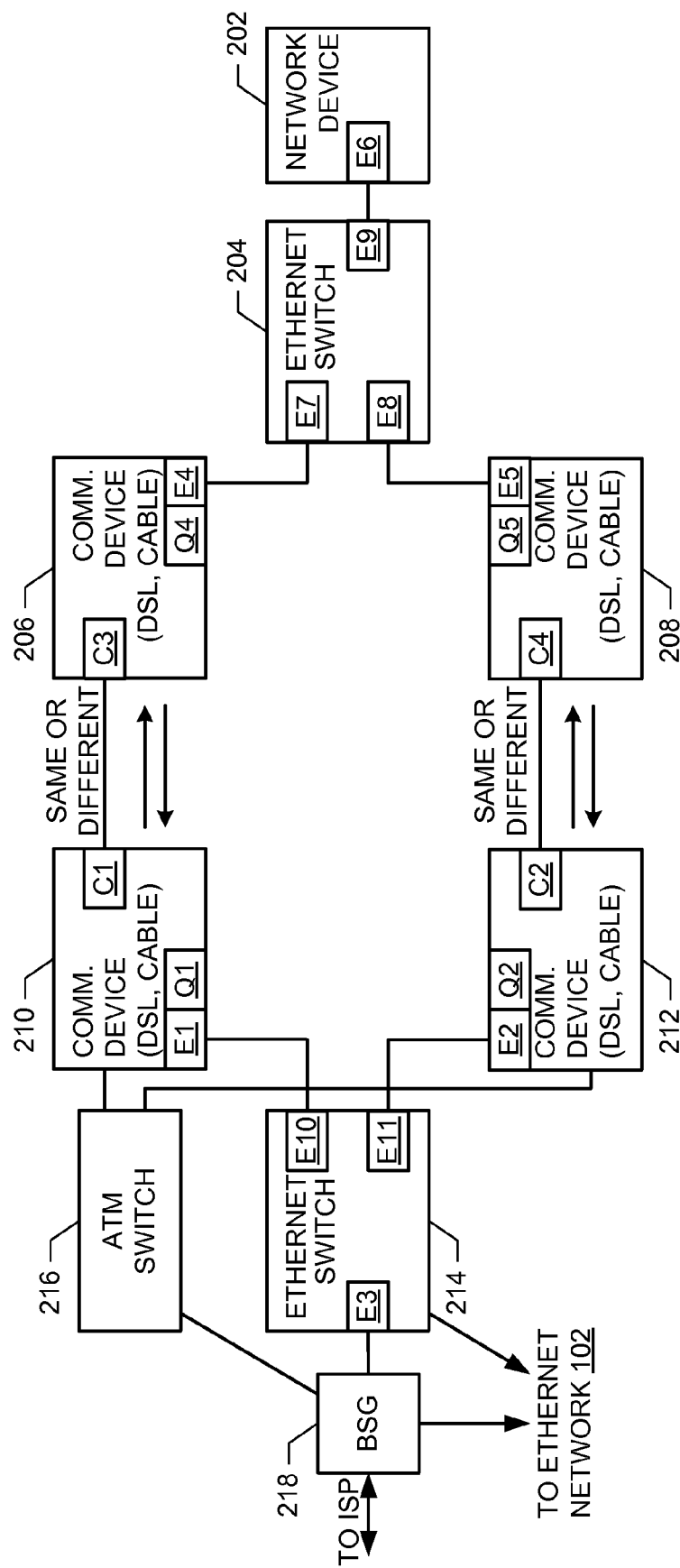
FIG. 2 is a diagram of the connectivity of devices according to an embodiment of the present invention to aggregate Ethernet links.

An example system for aggregating Ethernet communication is shown in FIG. 2. The example of FIG. 1 includes a communication device 210 having an Ethernet port E1 and a communication port C1, and a communication device 212 having an Ethernet port E2 and a communication port C2. The example system further includes an Ethernet switch 214 in data communication with the Ethernet ports E1 and E2 of the communication device 210 and the communication device 212 via respective Ethernet ports E10 and E11 of the Ethernet switch 214. The Ethernet switch 214 includes an Ethernet port E3 such that data communication of the Ethernet port E3 of the Ethernet switch 214 are provided through the communication port C1 of the communication device 210 and the communication port C2 of the communication device 212.

The example system of FIG. 2 further includes a communication device 206 having an Ethernet port E4 and a communication port C3, a communication device 208 having an Ethernet port E5 and a communication port C4, and a network device 202 having an Ethernet port E6. An Ethernet switch 204 has an Ethernet port E7 in communication with the Ethernet port E4 of the communication device 206 and has an Ethernet port E8 in communication with the Ethernet port E5 of the communication device 208. The Ethernet switch 204 aggregates communication with the communication device 206 and the communication device 208 to provide communication through an Ethernet port E9 in communication with the network device 202.

As shown in FIG. 2, the communication port C3 of the communication device 206 is in data communication with the communication port C1 of the communication device 210, and the communication port C4 of the communication device 208 is in data communication with the communication port C2 of the second communication device 212.

As shown in FIG. 2, the Ethernet communications of an Ethernet link may be transferred by multiple lower level communications devices 206, 208 such as DSL or cable modems 106 that communicate with distant multiple communications devices 210, 212 such as cable or DSL modems 108. Where the data service is asymmetric, the upload speed differs from the download speed as provided form the communication devices 206, 208, 210, and 212.

The subscriber has a network device 202 that utilizes Ethernet communications, such as a router linked to a personal computer or such as a network interface card ("NIC") of the personal computer. The Ethernet communications are exchanged between the Ethernet port E6 of the network device 202 and the Ethernet port E9 of an Ethernet switch 204. The Ethernet switch 204 then communicates via the Ethernet ports E7 and E8 and corresponding Ethernet ports E4 and E5 of the two communications devices 206, 208 using Ethernet communications, and aggregates the two devices 206, 208 for use by the network device 202. The Ethernet switch 204 may aggregate communications with the two devices 206, 208 in accordance with the link aggregation standard IEEE 802.1 ad.

The communications devices 206, 208 then exchange communications with the communications devices 210, 212 via respective pairs of the communication ports C1, C3 and C2, C4 over the copper lines, such as the RJ-11 phone line interface between DSL modems or the cable television coaxial interfaces between cable modems. This exchange between the communications devices 206, 208, 210 and 212 may either be symmetric or asymmetric, depending upon configuration of the communications devices 206, 208, 210, and 212. The communications devices 210, 212 also communicate with an Ethernet switch 214 that aggregates the communications of the communications devices 210, 212 when exchanging communications with the Ethernet network 102. The Ethernet switch 214 may exchange communications with downstream device such as an ATM switch 216 or broadband service gateway ("BSG") 218. The Ethernet switching that provides for the aggregation of communication devices may alternatively be incorporated into the BSG 218 rather than utilizing an external Ethernet switch 214. The data communications from the communications devices 210, 212 may be exchanged with the Ethernet switch 214 by a direct Ethernet interface for a DSLAM, by ATM interfaces through the ATM switch 216 (e.g., Ethernet over ATM encapsulation), or by interfaces from the BSG 218 (e.g., Ethernet, ATM, or Ethernet encapsulated over an Internet Protocol interface).

To optimize the aggregated communications devices 206, 208, 210 and 212, the Ethernet switches 204, 214 may perform rate shaping and/or load balancing. The Ethernet switches 204, 214 may perform rate shaping by directing frames of data according to the upload speed of the communications devices 206, 208, 210 and 212 being aggregated by the Ethernet switch 204, 214. Thus, the Ethernet switches 204, 214 may store in memory any upload speed differential that may exist between the two communications devices 206, 208, 210 and 212 connected to the ports E7, E8, E10, E11 of the aggregator device 204, 214. An example where the two communications devices 206, 208, 210 and 212 being aggregated by the Ethernet switch 204, 214 have different upload speeds is illustrated in FIG. 3.

Figure 3:
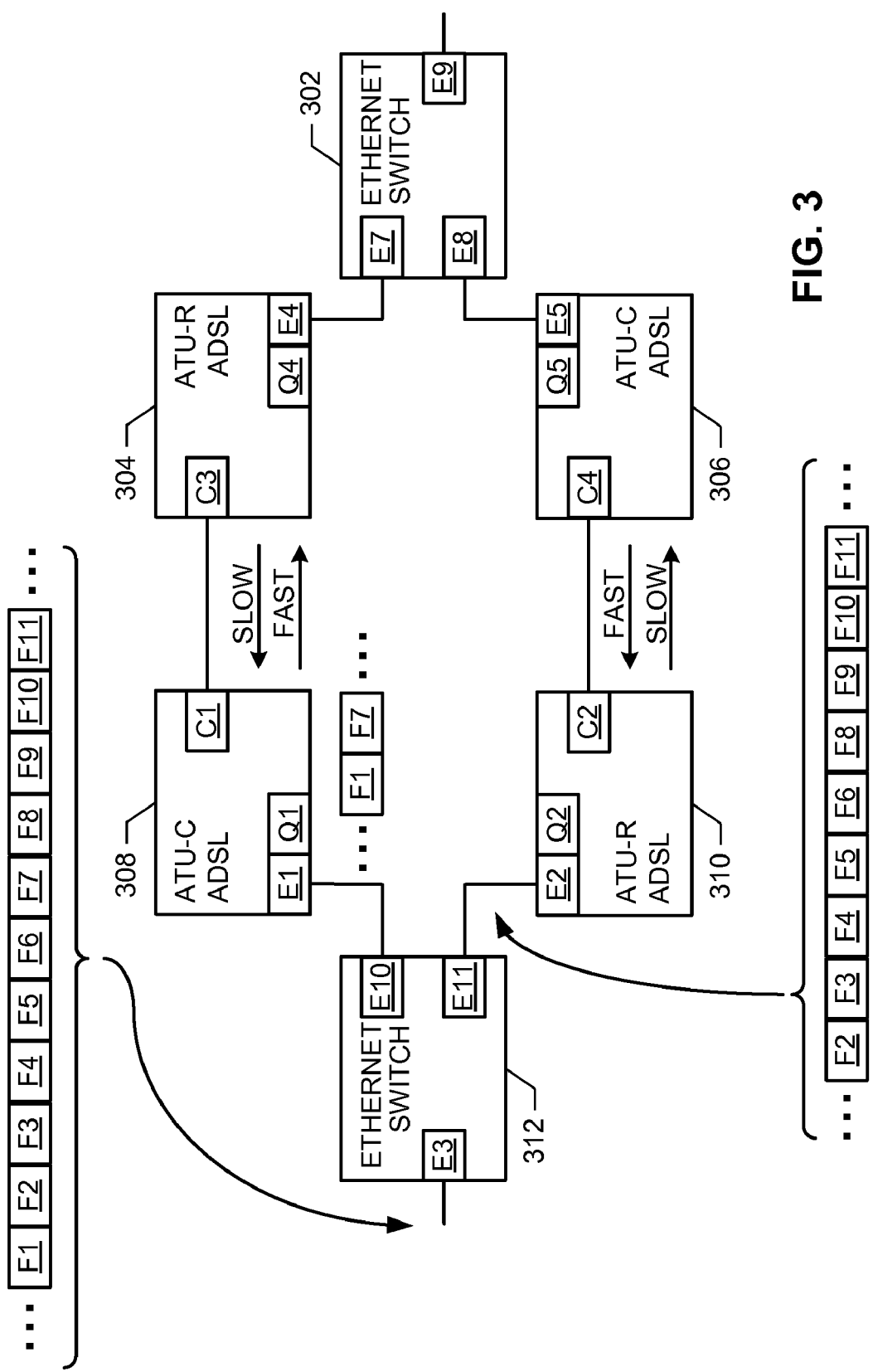
FIG. 3 is a diagram of the connectivity of a symmetric DSL configuration utilizing multiple asymmetric DSL modems per service endpoint, which may utilize embodiments of the present invention to aggregate the multiple asymmetric DSL modems.

In the example of FIG. 3, the communications devices 206, 208, 210 and 212 of FIG. 2 are ADSL modems 304, 306, 308, and 310, respectively, where the asymmetry is flipped for the two modems 304, 306, 308, 310 at each endpoint so that a symmetric data transfer results. One Ethernet switch 312 aggregates an ATU-C ADSL modem 308 having a relatively faster upload speed with an ATU-R ADSL modem 310 having a, relatively faster download speed. Likewise, Ethernet switch 302 aggregates an ATU-R ADSL modem 304 having a relatively faster download speed with an ATU-C ADSL modem 306 having a relatively faster upload speed. The ATU-R modems 304, 310 communicate with the ATU-C modems 308, 306, respectively, to establish the bi-directional data transfer. With this example ADSL configuration, the differential in upload speeds for each aggregated pair of modems may be defined as 8 megabits per second upload for one communication device and 1.5 megabits per second upload for the other communication device, which results in an example differential factor of 5.3. The Ethernet switch 302, 312 may then channel every sixth frame F1, F6 to the modem 304, 306, 308, 310 with the slow upload speed while the five preceding frames F2-F6, F7-F11 are channeled to the modem 304, 306, 308, 310 with the fast upload speed, as depicted in FIG. 3.

In addition to rate shaping, the Ethernet switches 204, 214, 302 and 312 of FIGS. 2 and 3 may load balance between the communications devices being aggregated. The Ethernet switch 204, 214, 302, 312 communicates status information with the communications devices 206, 208, 210, 212, 304, 306, 308, 310 being aggregated to detect the amount of data that a communications device 206, 208, 210, 212, 304, 306, 308, 310 has queued to transfer. If one of the communications devices 206, 208, 210, 212, 304, 306, 308, 310 has overly filled its respective queue Q1, Q2, Q4, Q5 relative to the other communications device 206, 208, 210, 212, 304, 306, 308, 310, such as due to frame retransmissions or other similar reasons, then more frames are temporarily directed to the other communications device 206, 208, 210, 212, 304, 306, 308, 310 until the relative loads of each communications device 206, 208, 210, 212, 304, 306, 308, 310 have become balanced.

Figure 4:
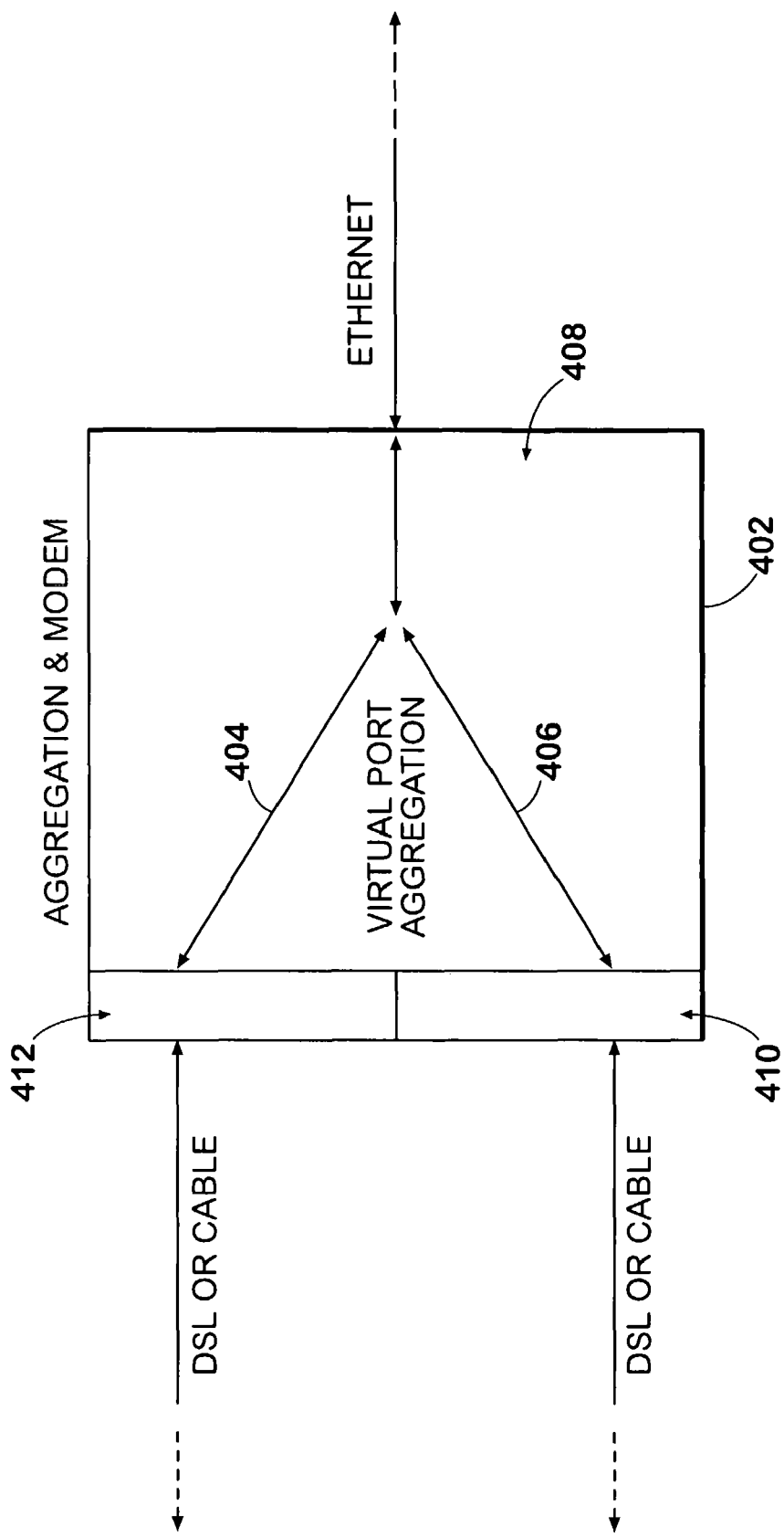
FIG. 4 is a diagram of an Ethernet aggregation device according to an embodiment of the present invention.

FIG. 4 shows an embodiment of an Ethernet aggregator device 402 that incorporates the functionality of the Ethernet switch and the communications devices into one device. This Ethernet aggregator device 402 may be utilized at the subscriber side, the service provider side, or at both sides. The device 402 includes an Ethernet switching portion 408 that has an Ethernet port for exchanging Ethernet communications. The Ethernet switching portion 408 directs the Ethernet communications via virtual port aggregation between a first communication portion 410 and a second communication portion 412. Thus, there is a virtual port pathway 404 between the switching portion 408 and the communications portion 412 while there is a virtual port pathway 406 between the switching portion 408 and the communications portion 410. These two communication portions correspond to integrated modems, such as DSL or cable modems. Each of these communications portions exchanges communications carrying Ethernet frames through communications ports, such as PSTN RJ-11 ports for DSL modems or coaxial ports for cable modems.

As discussed above, the subscriber of the Ethernet service is provided access to aggregated Ethernet communications that utilize multiple lower level communications devices to increase the bandwidth available for data transfer between the subscriber and the Ethernet network. Thus, data transports such as lines suitable for DSL or cable modem communications for an existing service provider configuration may be aggregated at the Ethernet level at both the subscriber and service provider end to provide the increased bandwidth service to the subscriber.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
    configuring a first non-zero data rate for a first communication port associated with a first communication device, the first communication device having a first Ethernet port and the first communication port;
    configuring a second non-zero data rate for a second communication port associated with a second communication device, the second communication device having a second Ethernet port and the second communication port; and
    performing rate shaping with an Ethernet switch communicatively coupled to the first Ethernet port and the second Ethernet port, the Ethernet switch comprising a third Ethernet port to receive Ethernet frames, and wherein the Ethernet switch is to perform the rate shaping by:
        directing nth ones of the Ethernet frames to a first queue associated with the first Ethernet port;
        directing n-1 Ethernet frames preceding each of the nth ones of the Ethernet frames to a second queue associated with the second Ethernet port; and
        selecting a value of n based on a ratio of the first non-zero data rate and the second non-zero data rate, and based on a remaining capacity of the first queue, wherein the first and second communication devices are to collectively transport the Ethernet frames received at the third Ethernet port to a same customer premises and the first data rate is different from the second data rate.

2. A method as defined in claim 1, wherein the first and second communication devices are digital subscriber line (DSL) modems.

3. A method as defined in claim 2, wherein the first and second DSL modems are asymmetric DSL (ADSL) modems.

4. A method as defined in claim 3, wherein the first ADSL modem has a slower upload speed than download speed and wherein the second ADSL modem has a slower upload speed than download speed.

5. A method as defined in claim 1, wherein the first communication device has a faster upload speed than download speed and wherein the second communication device has a slower upload speed than download speed.

6. A method as defined in claim 5, wherein the first and second communication devices are asymmetric digital subscriber line (ADSL) modems.

7. An apparatus comprising:
    a first communication device configured at a first non-zero data rate for a first communication path and to communicate via the first communication path at the first non-zero data rate, the first communication device having a first Ethernet port;
    a second communication device configured at a second non-zero data rate for a second communication path and to communicate via the second communication path at the second non-zero data rate, the second communication device having a second Ethernet port, the second data rate different from the first data rate;
    a network device having a third Ethernet port; and
    an Ethernet switch comprising:
        a fourth Ethernet port to communicate with the first Ethernet port of the first communication device;
        a fifth Ethernet port to communicate with the second Ethernet port of the second communication device; and
        a sixth Ethernet port configured to receive Ethernet frames from the third Ethernet port of the network device, wherein the Ethernet switch is to direct nth ones of the Ethernet frames to the first communication device via the first and fourth Ethernet ports and to direct n-1 Ethernet frames preceding each of the nth ones of the Ethernet frames to the second communication device via the second and fifth Ethernet ports, wherein n is selected based on a ratio of the first non-zero data rate and the second non-zero data rate, and based on a remaining capacity of a first queue associated with the first Ethernet port, wherein the first and second communication devices collectively transport the Ethernet frames received at the sixth Ethernet port to a same customer premises.

8. An apparatus as defined in claim 7, wherein the first and second communication devices are digital subscriber line (DSL) modems.

9. An apparatus as defined in claim 8, wherein the first and second DSL modems are asymmetric DSL modems.

10. An apparatus as defined in claim 9, wherein the first asymmetric DSL modem has a faster upload speed than download speed and wherein the second asymmetric DSL modem has a slower upload speed than download speed.

11. An apparatus as defined in claim 7, wherein the first communication device has a faster upload speed than download speed and wherein the second communication device has a slower upload speed than download speed.

12. An apparatus as defined in claim 11, wherein the first and second communication devices are asymmetric digital subscriber line (ADSL) modems.

13. An apparatus comprising:
a first communications portion corresponding to a first virtual Ethernet port and being linked to a first communications port configured to communicate at a first non-zero data rate on a first communications link and to communicate a first plurality of Ethernet frames on the first communications link at the first non-zero data rate;
a second communications portion corresponding to a second virtual Ethernet port being linked to a second communications port configured to communicate at a second non-zero data rate on a second communications link and to communicate a second plurality of Ethernet frames on the second communications link at the second non-zero data rate, wherein the second non-zero data rate is different from the first non-zero data rate; and
an Ethernet switching portion linked to an Ethernet port to receive a third plurality of Ethernet frames, wherein the Ethernet switching portion is to demultiplex, based on a ratio of the first and second non-zero data rates and a remaining capacity of a queue associated with the first virtual Ethernet port, the third plurality of Ethernet frames to form the first and second pluralities of Ethernet frames from the third plurality of Ethernet frames, to provide the first plurality of Ethernet frames to the first virtual Ethernet port, and to provide the second plurality of Ethernet frames to the second virtual Ethernet port.

14. An apparatus as defined in claim 13, wherein the first and second communications portions comprise integrated digital subscriber line (DSL) modems.

15. An apparatus as defined in claim 14, wherein the first and second integrated DSL modems are asymmetric DSL (ADSL) modems.

16. An apparatus as defined in claim 15, wherein the first ADSL modem has a faster upload speed than download speed and wherein the second ADSL modem has a slower upload speed than download speed.

17. An apparatus as defined in claim 13, wherein the first data rate is greater than the second data rate.

18. An apparatus as defined in claim 17, wherein the first and second communications portions are integrated ADSL modems.

19. An apparatus as defined in claim 13, wherein the Ethernet switching portion is to demultiplex the third plurality of Ethernet frames to form the first and second plurality of Ethernet frames by:
channeling nth ones of the third plurality of Ethernet frames to the queue associated with the first Ethernet port; and
channeling n-1 Ethernet frames preceding each of the nth ones of the third plurality of Ethernet frames to a second queue associated with the second Ethernet port.

* * * * *

UNITED STATES PATENT AND TRADEMARK OFFICE
CERTIFICATE OF CORRECTION

PATENT NO. : 7,630,412 B2 Page 1 of 1
APPLICATION NO. : 10/636366
DATED : December 8, 2009
INVENTOR(S) : Wright et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-first Day of December, 2010

David J. Kappos
*Director of the United States Patent and Trademark Office*